United States Patent [19]

Ono et al.

[11] Patent Number: 5,080,131
[45] Date of Patent: Jan. 14, 1992

[54] MASS FLOW CONTROLLER

[75] Inventors: Hirofumi Ono; Tatsuhiko Furukado, both of Shiga, Japan

[73] Assignee: Lintec Co., Ltd., Shiga, Japan

[21] Appl. No.: 579,521

[22] Filed: Sep. 10, 1990

[30] Foreign Application Priority Data

Sep. 26, 1989 [JP] Japan .................................. 1-251606
Jan. 15, 1990 [JP] Japan ...................................... 2-6029

[51] Int. Cl.⁵ .................................................. G05D 7/00
[52] U.S. Cl. .................................... 137/599; 137/486;
137/487.5; 73/204.21; 138/44
[58] Field of Search .................... 137/486, 599, 487.5;
138/44, 46, 45; 73/861, 204.11, 204.17, 204.21

[56] References Cited

U.S. PATENT DOCUMENTS

| | | | |
|---|---|---|---|
| 3,349,619 | 10/1967 | Millar | 138/44 X |
| 4,241,896 | 12/1980 | Voege | 138/44 X |
| 4,858,643 | 8/1989 | Vavra | 137/486 |

*Primary Examiner*—Alan Cohan
*Attorney, Agent, or Firm*—Edwin E. Greigg; Ronald E. Greigg

[57] ABSTRACT

A mass flow controller having a bypass portion provided in a body through which a large amount of gas is passed and a sensor portion, laid between a primary chamber which is an inlet of the bypass portion and a secondary chamber which is an outlet of the bypass portion, through which gas flows at a small flow rate proportional to the flow rate of the gas passed through the bypass portion and capable of measuring the total flow rate of gas by measuring the flow rate in the sensor portion. The body is partitioned by a bulkhead into a primary chamber and a secondary chamber. The primary chamber is provided with an inlet for gas inflow and the secondary chamber is provided with an outlet for gas outflow. The bulkhead is provided with a plurality of through holes for connecting the primary chamber to the secondary chamber, and bypass elements selected depending on the flow rate in the bypass portion are fitted in the through holes in the bulkhead. Expansion plugs are fitted in the through holes in which no bypass elements are fitted not to cause gas to flow.

4 Claims, 12 Drawing Sheets

MASS FLOW CONTROLLER

BACKGROUND OF THE INVENTION

1. Field of the Invention

The present invention relates to a mass flow controller capable of increasing the flow rate by a factor of two without changing the size between joints of an existing mass flow controller, capable of accurately controlling the flow rate even if the diameter of a control valve is increased with increasing flow rate, capable of restraining the generation of particles to the utmost in opening or closing the control valve, and having sealing properties which are stable for a long time in a connecting boundary between members constituting the path of flow of fluid such as gas or liquid.

2. Description of the Prior Art (A) In the field of the manufacture of semiconductors, particularly very large scale integrated circuits, the diameter of a wafer tends to be increased from four inches to six inches and further, to eight inches so as to increase production and reduce costs. Correspondingly, the flow rate of gas used for manufacturing the very large scale integrated circuits is increased. It is desired that the mass flow controller copes with this trend.

Problem 1

Mass flow controllers (100A) generally used are so standardized that the size between an inlet joint (114) of gas and an outlet joint (115) of gas is approximately the same so as to provide interchangeability of the connection among manufacturers. The allowable limit of the flow rate is almost determined by the size between joints. For example, the flow rate is limited to 5 l/min in a certain type of mass flow controller, and the flow rate is limited to 20 l/min in a type of mass flow controller for a larger flow rate.

Consequently, when gas must be caused to flow at a flow rate exceeding the allowable limit, a larger-sized mass flow controller (100A) must be selected to increase the size between the inlet joint (114) of gas and the outlet joint (115) of gas. However, in order to make the mass flow controller (100A) larger in size, (1) a gas supply system of a semiconductor manufacturing apparatus must be significantly improved. If the mass flow controller (100A) is made larger in size, (2) the cost thereof rapidly rises for reasons as described later, (3) it becomes heavy and it takes a lot of time and labor for the mounting work on piping and maintenance, and (4) it is not compatibile with the conventional type of mass flow controller so that the number of types of mass flow controllers must be increased, thereby to complicate the management by both manufacturers and users and to increase the management costs.

Problem 2

Attempts to increase only the mass flow rate utilizing the conventional type of mass flow controller without any modification have been made. However, the following problems arise in such a case.

(1) If gas is caused to flow in the mass flow controller (100A) at a predetermined flow rate or more, the relation between the flow rate and an output of a measured value in a sensor portion is out of proportionality. If gas is caused to flow at a certain flow rate or more, the output is inversely lowered, to make it impossible for the mass flow controller (100A) to control the flow rate.

(2) If a pressure differential across an inlet and an outlet of a bypass element (108) is increased to increase the flow rate, the state of gas flow is changed from laminator flow to turbulent flow. Accordingly, characteristics of differential pressure versus flow rate are significantly outside a proportional straight line, and the flow rate in a sensor and the flow rate in a bypass are out of proportionality.

Furthermore, how gas flows differs depending on the type of the gas, to make it difficult for the mass flow controller (100A) to accurately control the flow rate.

Additionally, since the flow rate in a sensor and the flow rate in a bypass are out of proportionality, the mass flow controller (100A) is too significantly affected by the temperature and pressure to be practical.

Problem 3

Moreover, the factors which prevent the increase in mass flow rate exist in a bypass structure of the conventional type of mass flow controller shown in FIG. 25. More specifically, the problems are as follows.

(1) A bypass element (108) in the conventional type of mass flow controller (100A) is not suitable for a large flow rate because a lot of capillary tubes (113) for a bypass having the same inner diameter and length as those of a sensor tube (109) are bundled and a protecting tube (134) is filled with the bundled capillary tubes (113) to construct the bypass element (108), as shown in FIGS. 6 and 7.

More specifically, in the mass flow controller (100A), the relation between a pressure differential across both ends of the bypass element (108) and the flow rate must be approximately linear. For example, if the flow rate in one capillary tube (113) for a bypass is 10 ml/min, 1000 capillary tubes (113) must be bundled in a mass flow controller for the maximum flow rate of 10 l/min, and 2000 capillary tubes (113) must be bundled in a mass flow controller for the maximum flow rate of 20 l/min, and a large number of capillary tubes (113), for example, 5000 capillary tubes (113) must be bundled in a mass flow controller for the maximum flow rate of 50 l/min, to significantly raise the costs of the respective mass flow controllers.

(2) On the other hand, it is impossible to cause gas to flow in a mass flow controller for the maximum flow rate of 5 l/min at a flow rate of 20 l/min because the cross sectional area of a bypass is limited. If it is desired to cause gas to flow at a flow rate of 20 l/min, the cross sectional area must be increased as required. However, a lot of capillary tubes (113) are required as described above to raise the cost of the mass flow controller, which is not practical. From such reasons, in the mass flow controller (100A) having the conventional structure, it is difficult to increase the flow rate without changing the size between joints due to the bypass structure itself.

(B) Additionally, the above described increase in flow rate is restricted by the structure of a control valve (130) in a control valve portion (100B). More specifically, as shown in FIGS. 15 and 16, if it is desired to increase the capacity of the mass flow controller (100A), the increase in diameter of the control valve (130) cannot be avoided so as to handle a large flow rate. However, if the diameter of the control valve (130) is increased, the pressure receiving area of the control valve (130) is increased, so that the mass flow controller (100A) is pressed in the direction in which the control valve (130) is closed while being pushed up in the direction in which it is opened by the fluid pressure, thereby to make it difficult to perform an accurate operation. Accordingly, the mass flow rate cannot be accurately controlled, thereby to make it impossible to achieve the required precision. The comparison between the present invention and the conventional example will be described later.

(C) Furthermore, in manufacturing very large scale integrated circuits, if fine particles are included in fluid, the quality and yield of a product are significantly affected. In the conventional mass flow controller (100A), however, a portion of the control valve (130) which is only one movable portion becomes the source of particles. More specifically, the conventional mass flow controller (100A) uses the hard control valve (130) made of stainless steel and uses as a valve seat an upper surface of a hard body (100) made of stainless steel. Accordingly, the generation of fine particles due to friction cannot be avoided every time the control valve (130) is opened or closed.

(D) Additionally, in the manufacturing processes of very large scale integrated circuits, a variety of gases or liquids such as corrosive one such as chlorine or fluorine, significantly poisonous one and explosive one are used. In a connecting boundary between members constituting the path of flow of fluid, an O-ring (144b) made of fluorocarbon rubber and a gasket (144b) made of stainless steel, for example, have been generally used so as to completely prevent leakage. However, the O-ring (114b) made of fluorocarbon rubber is more durable than an O-ring made of the other rubber but is still dissatisfactory in terms of long-term stability. In addition, it cannot be used for swelling gas. Furthermore, an O-ring or a C-ring made of stainless steel is satisfactory in terms of durability. However, when members are clamped with the O-ring or the C-ring made of stainless steel being interposed therebetween, the rings cut into a connecting surface of the members to leave indentations. Accordingly, if it is desired that the members are loosened to be decomposed and repaired and cleaned, for example, and then, assembled and used again, leakage is developed due to the above indentations. Consequently, the members cannot be used unless the connecting surface thereof is ground again, which is a problem in terms of maintenance.

SUMMARY OF THE INVENTION

An object of the present invention is to provide a mass flow controller capable of enlarging the range of the flow rate without almost changing the size between joints of an existing mass flow controller and capable of ensuring a large flow rate at low cost without requiring a lot of capillary tubes for a bypass in increasing the flow rate.

In order to attain the above described object, the present invention provides a mass flow controller having a bypass portion through which a large amount of gas is passed and a sensor portion through which gas flows at a small flow rate proportional to the flow rate of the gas passed through the bypass portion and capable of measuring the total flow rate of gas by measuring the flow rate in the sensor portion, wherein an inlet for gas inflow is provided in one end of a body and an outlet for gas outflow is provided in the other end thereof, a bulkhead is provided within the body approximately parallel with the direction of gas flow from the inlet to the outlet, a primary chamber communicating with the above inlet is formed on a forward side of the bulkhead and a secondary chamber communicating with the above outlet is formed on a backward side of the bulkhead, respectively, through the above bulkhead, the bulkhead is provided with bypass elements for connecting the primary chamber to the secondary chamber, and a sensor tube for measuring the flow rate of gas is provided between the primary chamber and the secondary chamber.

As a result, the number of bypass elements on the bulkhead may be increased or decreased depending on the flow rate of gas which must be caused to flow through the bypass elements (that is, expansion plugs are provided in through holes from which the bypass elements are elminated because the flow rate is small). In addition, the bulkhead is provided inside of the body approximately parallel with the direction of the gas flow from the inlet to the outlet. Accordingly, the size of the mass flow controller in the direction parallel to the gas flow can be effectively made use of. Moreover, the bypass elements are thus arranged in parallel in the direction nearly at right angles to the gas flow. Accordingly, gas can be caused to flow through the bypass elements in a laminator flow region. Consequently, the flow rate can be increased as required without degrading characteristics of differential pressure versus flow rate. Furthermore, the bypass elements are only fitted in the bulkhead in conformity with the flow rate. Accordingly, the bypass elements can be of one type.

Furthermore, in order to attain the above described object, lines for increasing differential pressure are respectively provided between a primary chamber and an inlet of a sensor tube and between an outlet of the sensor tube and a secondary chamber so as to make a pressure differential across both ends of a bypass element larger than a pressure differential across both ends of the sensor tube.

Consequently, an advantage of the present invention is that the pressure differential across an inlet and an outlet of the bypass element can be made larger than the pressure differential across the inlet and the outlet of the sensor tube, so that a larger amount of gas can be caused to flow in the bypass element, thereby to make it possible to increase the capability of the mass flow controller by a factor of n without changing the size thereof.

Another object of the present invention is to provide a mass flow controller having a valve structure capable of fully corresponding to the large flow rate without decreasing the control precision of the mass flow rate even if the diameter of a control valve is increased.

In order to attain the above described object, the present invention provides a mass flow controller comprising a sensor portion for sensing the flow rate of gas, a control valve portion for controlling the flow rate of the gas on the basis of a sensing signal from the sensor portion, and a body on which the sensor portion and the control valve portion are mounted, wherein a valve chamber whose ceiling surface is a diaphragm is provided on the side of the control valve portion, a control valve whose lower surface is an opening is provided in the valve chamber, a spring for pressing and urging the control valve on the side of the diaphragm which is the ceiling surface is provided in a concave portion of the opening on the lower surface of the control valve, a driving portion for pressing the control valve against the elastic force of the spring on the side of a valve seat of the valve chamber through the diaphragm which is the ceiling surface and controlling the amount of spacing between the control valve and the surface of the valve seat is provided on the side of the diaphragm, an O-ring is interposed between an inner side surface of the valve chamber and an outer side surface of the control valve to divide the valve chamber into a space on the ceiling side and a space on the valve seat side, a primary-side valve path into which gas flows from the sensor portion is provided on the concave portion of the opening on the lower surface of the control valve, a secondary-side valve path communicating with the exterior is provided in the space on the valve seat side in the valve chamber, and a communicating hole for connecting the concave portion of the opening on the lower surface of the control valve to the space on the ceiling side in the valve chamber.

Consequently, a part of the gas which flows throught the primary-side valve path into the concave portion of the opening on the lower surface of the control valve enters the space on the ceiling side through the communicating hole, to make the atmospheric pressure in the space on the ceiling side equal to the pressure in the concave portion, to reduce the inflow pressure of the gas which flows through the primary-side valve path into the concave portion. Consequently, the pressure applied to the driving portion is reduced. Even in a case where the diameter of the control valve becomes large, the control valve can be caused to accurately control the flow rate.

On the other hand, the primary-side valve path into which gas flows from the sensor portion may be provided in the space on the valve seat side in the valve chamber, the secondary-side valve path communicating with the exterior may be provided in the concave portion of the opening on the lower surface of the control valve, and the control valve may be provided with the communicating hole for connecting the concave portion of the opening on the lower surface of the control valve to the space on the ceiling side in the valve chamber, in which case the same effect can be achieved.

Still another object of the present invention is to provide a mass flow controller superior in airtightness at the time of blocking a control valve by using a gold ring as a valve seat of the control valve and capable of restraining the generation of particles to be the source of foreign matter to the utmost at the time of opening or closing the control valve.

In order to attain the above described object, the present invention provides a mass flow controller having a sensor portion for measuring the flow rate of gas and a bypass portion in which gas flows at a flow rate proportional to the flow rate of the gas flowing in the sensor portion, the paths of flow communicating with an outlet joint connected to an external device being provided with a control valve into which mixed gas from the bypass portion and the sensor portion flows, wherein a gold ring is provided as a valve seat which the control valve abuts on and is separated from.

As a result, an advantage of the present invention is that at the time of blocking the hard control valve, an edge on which the control valve abuts is pressed against the soft gold ring which is the valve seat, to make it possible to completely cut off the paths to prevent leakage of gas. In addition, since the hard control valve abuts on the soft gold ring which is the valve seat, the possibility is eliminated that the hard control valve and the hard valve seat come into contact with each other to generate particles as in the conventional example. Accordingly, substantially clean gas can be accurately supplied to the subsequent processes. Furthermore, since the gold ring is provided as the valve seat, the valve seat is chemically very stable and thus, can correspond to most of fluids.

A further object of the present invention is to provide a mass flow controller stable with respect to most of gases and liquids and superior in durability as well as not damaging a connecting surface of members constituting the path of flow of fluid in clamping the members by using a gold ring in a connecting boundary between the members.

In order to attain the above described object, according to the present invention, a gold-ring for sealing which surrounds the path of flow and is airtightly held by the connecting boundary between the members is provided in the connecting boundary.

As a result, an advantage of the present invention is that not the hard members but the soft gold ring is crushed in clamping the members and the crushed gold ring is airtightly embedded in the connecting boundary between the members to completely seal the connecting boundary and not to damage the connecting surface of the members by the crush of the soft gold ring in clamping the members, so that the members can be used without any modification at the time of decomposition or reassembly to eliminate the need for grinding of the connecting surface of the members. In addition, another advantage of the present invention is that since the gold ring which is chemically very stable is used, the gold ring is not affected by most of fluids, not to develop leakage due to the degradation of a sealed portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
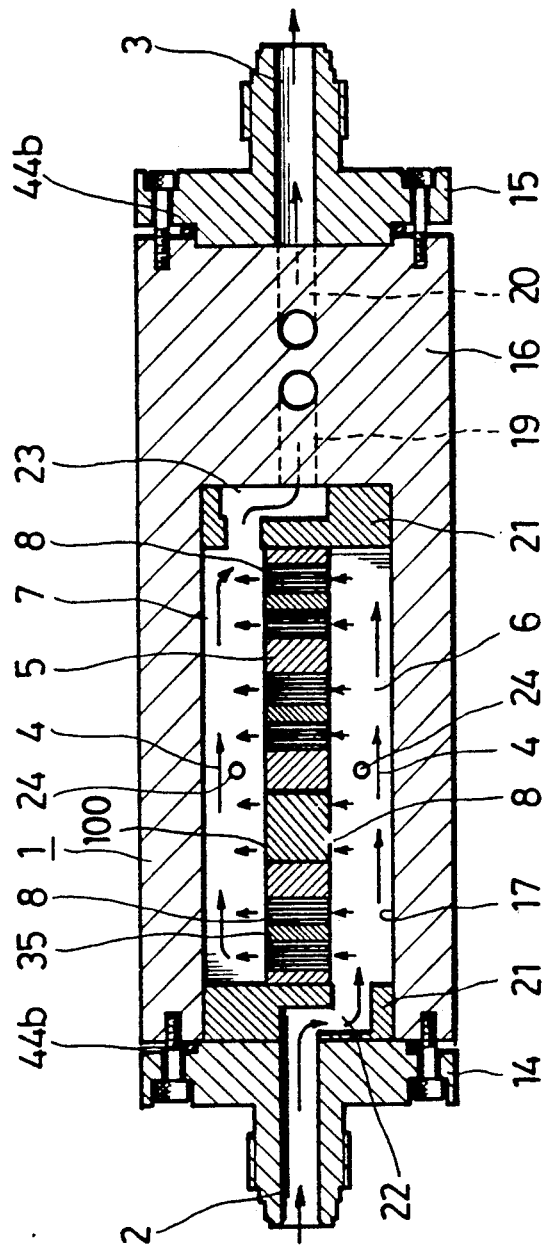
FIG. 1 is a schematic cross sectional plan view showing a mass flow controller according to one embodiment of the present invention.
Figure 2:
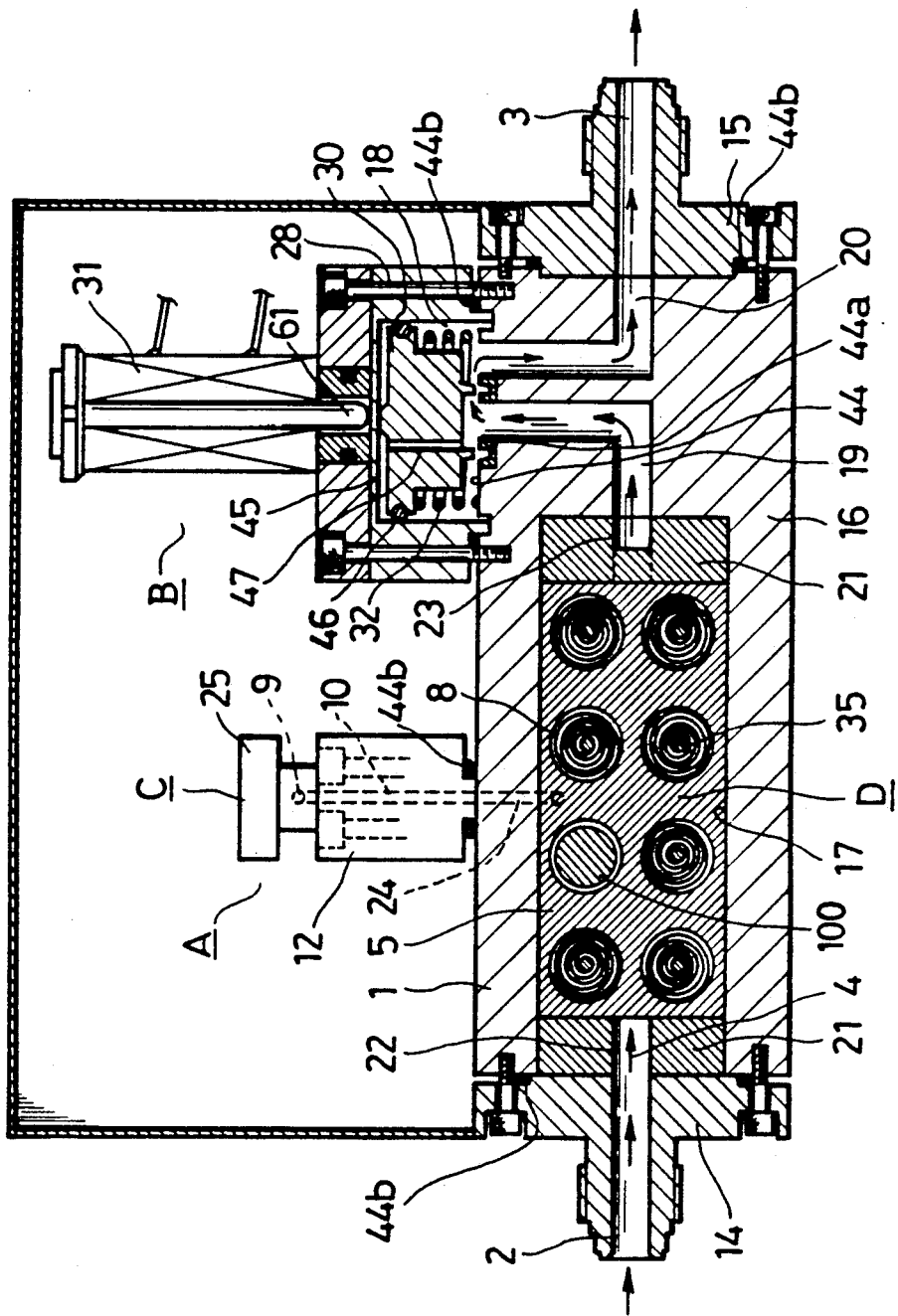
FIG. 2 is a vertical sectional view showing the center of the mass flow controller shown in FIG. 1.
Figure 3:
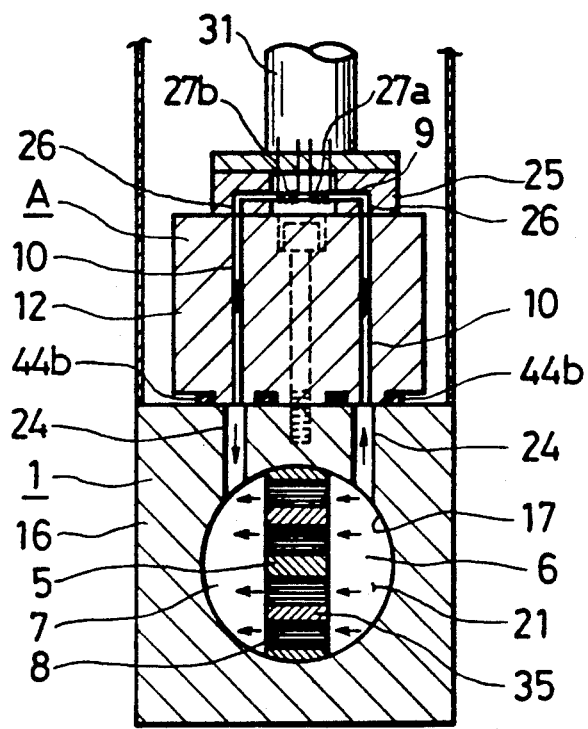
FIG. 3 is a cross sectional view in a direction at right angles of FIG. 2 through a sensor portion.

A first embodiment of the present invention will be described in detail with reference to the drawings. FIG. 1 is a cross sectional plan view showing a first embodiment of a mass flow controller (A) according to the present invention, FIG. 2 is a cross sectional front view thereof, and FIG. 3 is a vertical sectional view thereof. The mass flow controller (A) mainly comprises a body (1), a sensor portion (C) and a control valve portion (B) disposed on the body (1).

The body (1) comprises a main body (16), and an inlet joint (14) and an outlet joint (15) which are respectively fixed to both ends of the main body (1). The inlet joint (14) is provided with an inlet (2) for gas inflow, and the outlet joint (15) is provided with an outlet (3) for gas outflow. Gold rings (44b) for sealing are airtightly fitted between the above inlet joint (14) and the main body (16) and between the outlet joint (15) and the main body (16), respectively, to surround the inlet (2) and the outlet (3). The main body (16) is provided with a cylindrical bore (17) open to its one end. A primary-side valve path (19) communicating with a valve chamber (18) in the control valve portion (B) and a secondary-side valve path (20) communicating with the other end of the main body (16) from the valve chamber (18) are provided at the center of the bottom of the cylindrical bore (17). In addition, a bulkhead (5) for partitioning the cylindrical bore (17) is airtightly fitted at the center of the cylindrical bore (17), to partition the cylindrical bore (17) into a primary chamber (6) and a secondary chamber (7). Circular flange portions (21) are provided in both ends of the bulkhead (5). The flange portions (21) are respectively provided with a primary-side communicating hole (22) for connecting the above inlet (2) to the primary chamber (6) and a secondary-side communicating hole (23) for connecting the secondary chamber (7) to an inlet of the above primary-side valve path (19). Further, the bulkhead (5) is provided with a plurality of (eight in the embodiment shown in FIG. 2) through holes. Bypass elements (8) are respectively fitted in the through holes. In addition, the bulkhead (5) may be made of metal or resin.

Figure 20:
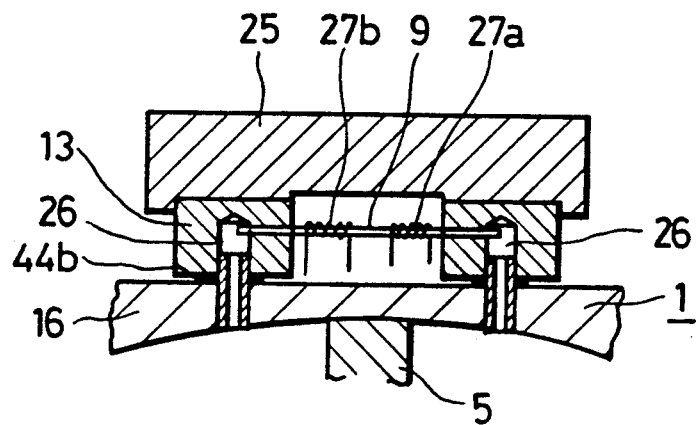
FIG. 20 is an enlarged detailed cross sectional view showing a state where a sensor portion is sealed by a gold ring according to the present invention.

The sensor portion (C) comprises a sensor tube (9) and a spacer (12) for increasing differential pressure. The spacer (12) is disposed and fixed on an upper surface of the main body (16). Two lines (10) for increasing differential pressure are provided in this spacer (12). The body (1) is provided with through holes (24) on the sensor side which are respectively open to the upper surface of the body (1) from the above primary and secondary chambers (6) and (7). The above lines (10) for increasing differential pressure respectively communicate with the through hole (24) on the sensor side. Gold rings (44b) are airtightly fitted in a connecting boundary between the spacer (12) and the main body (16) so as to prevent leakage in connecting boundaries between the lines (10) for increasing differential pressure in the spacer (12) and the through holes (24) on the sensor side. A sensor block (25) is disposed and fixed on an upper surface of the spacer (12). The sensor tube (9) is laid between sensor connecting holes (26) provided in the sensor block (25). A part of gas in the primary chamber (6) flows into the secondary chamber (7) through the sensor tube (9). Upstream-side and downstream-side heaters (27a) and (27b) are wound around the sensor tube (9). FIG. 20 is an enlarged detail showing the sensor portion (C) shown in FIG. 3.

Figure 19:
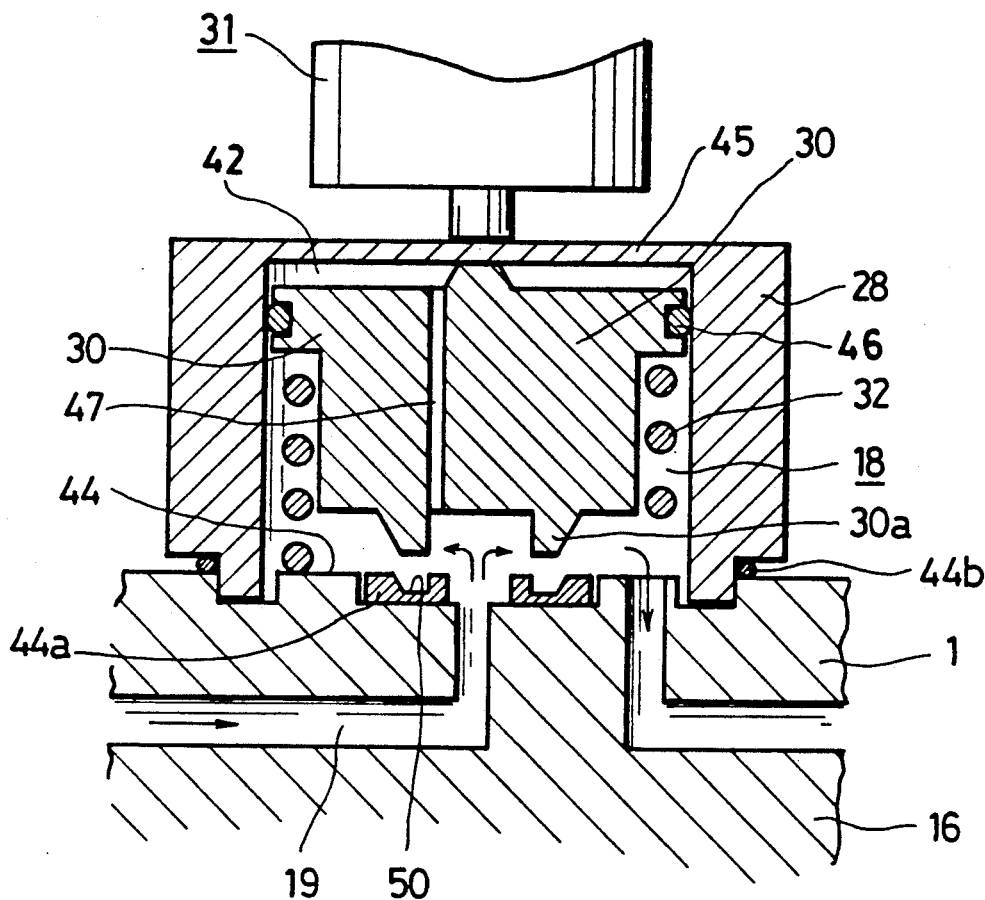
FIG. 19 is an enlarged cross sectional view showing a control valve portion shown in FIG. 1.

The control valve portion (B) comprises a valve housing (28) and a control portion (29), as shown in FIGS. 2 and 19. An outlet of the above primary-side valve path (19) and an inlet of the above secondary-side valve path (20) are open to the valve chamber (18), whose lower surface is an opening, provided in the valve housing (28). In the embodiment shown in FIG. 2, a ring-shaped concave portion for a valve seat (44) is provided around the primary-side valve path (19). A gold ring (44a) is fitted in this ring-shaped concave portion. The gold ring (44a) for a valve seat is provided with a ring-shaped concave groove (50) corresponding to a ring-shaped projection (30a) of a control valve (30), as shown in a cross sectional view of FIG. 19. It is preferable in terms of an improvement in airtightness at the time of blocking the control valve (30) that at least one sidewall of each of the above ring-shaped projection (30a) and the ring-shaped concave groove (50) is obliquely expanded and inclined. In addition, the control valve (30) is contained in the valve chamber (18) such that it can be raised and lowered, and is pressed and urged by a spring (32) against a driving portion (31) disposed on an upper surface of the valve housing (28) through a diaphragm (45). A lower surface of the control valve (30) coincides with the outlet of the primary-side valve path (19).

Figure 4:
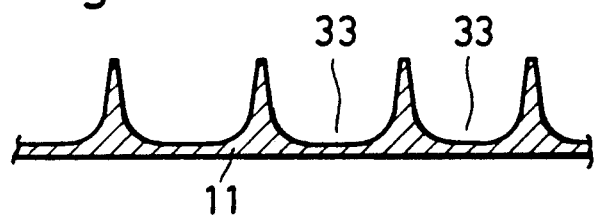
FIG. 4 is a partially developed and enlarged view showing a bypass element used in the present invention.

The bypass element (8) provided with bypass holes in the axial direction (see FIG. 5) is formed by providing a lot of concave grooves (33) in the width direction on the surface of a strip body (11) by etching as shown in FIG. 4 and winding this strip body (11) around a shaft (35). It is needless to say that the strip body (11) having the concave grooves (33) formed therein may be a molded body of resin. In addition, as shown in FIG. 5, an end of the bypass element (8) is slightly cut in a tapered shape so as to be circular when the strip body (11) is wound.

Figure 5:
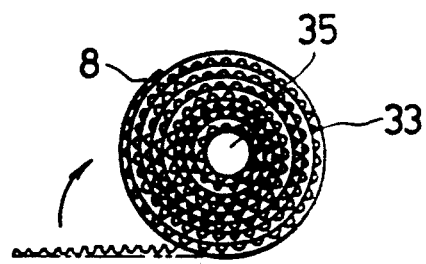
FIG. 5 is a front view showing the bypass element used in the present invention.
Figure 6:
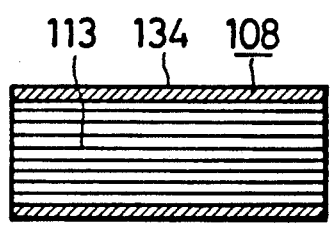
FIG. 6 is a cross sectional view showing a bypass element used in a conventional example.
Figure 7:
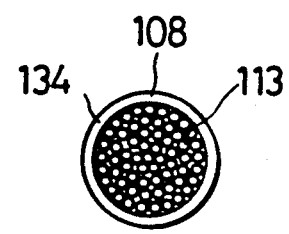
FIG. 7 is a front view showing the bypass element used in the conventional example.
Figure 8:
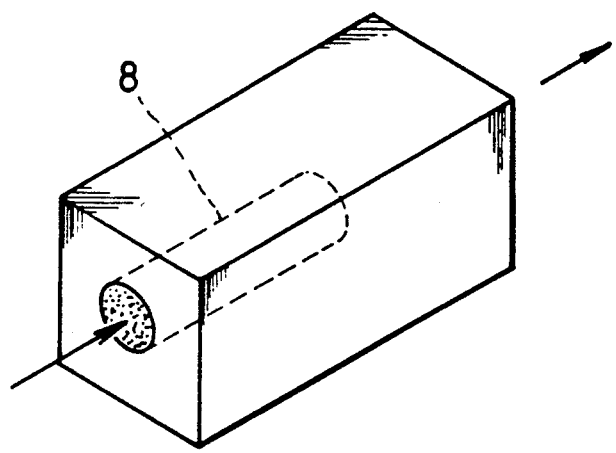
FIG. 8 is a schematic perspective view showing a conventional bypass element for a small flow rate.
Figure 9:
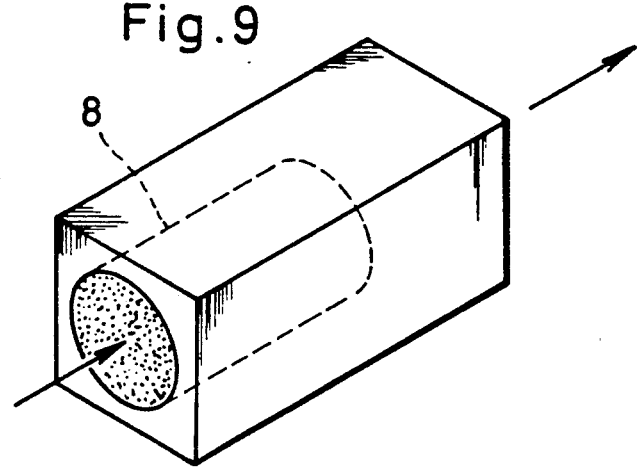
FIG. 9 is a schematic perspective view showing a conventional bypass element for a large flow rate.

In this case, as obvious from FIG. 5, there are no through holes in a portion other than the concave grooves (33). Accordingly, the flow rate can be accurately set by specifying the number of the concave grooves (33). On the other hand, in the conventional example shown in FIGS. 6 and 7, gas flows through capillary tubes (13) at a flow rate which is small but exceeds a specified one even if the number of the capillary tubes (13) is specified unless a narrow clearance between the capillary tubes (13) is not blocked, resulting in decreased precision. The concave groove (33) may be in a semicircular shape or an approximately rectangular shape with arc-shaped corners. It is desirable that all the concave grooves (33) have almost the same cross section such that the flow rates therein are almost the same. However, openings of the concave grooves (33) may have any cross sectional shape.

Although in the bypass element (8) shown in FIG. 5, the strip body (11) is wound such that the concave grooves (33) are outward, it goes without saying that it may be wound such that the concave grooves (33) are inward. The bypass element (8) thus formed is used with it being fitted in the through hole in the bulkhead (5), as shown in FIG. 2. A bulkhead (5) having through holes whose number is reduced depending on the flow rate is used, or a bulkhead (5) having a required number of through holes in which the bypass elements (8) are fitted and other through holes which are blocked by expansion plugs 100 is used.

The number of concave grooves (33) is suitably changed to fabricate herein four types of bypass elements through which gas respectively flows at flow rates of 10 ml/min, 100 ml/min, 1 l/min and 10 l/min. In this case, if the bypass elements are suitably selected depending on the flow rate and are fitted in the bulkhead (5), a lot of types of flow rates can be covered. On the other hand, in the conventional example, eleven types of bypass elements (8) through which gas respectively flows at flow rates of 10 ml/min, 20 ml/min, 50 ml/min, 100 ml/min, 200 ml/min, 500 ml/min, 1 l/min, 2 l/min, 5 l/min, 10 l/min and 20 l/min are required, so that the management thereof is troublesome. Moreover, in the mass flow controller (A) according to the present invention, the existence of lines (10) for increasing differential pressure connected to the sensor tube (9) through the sensor connecting holes (26) causes the resistance across the sensor tube (9) to be increased. Accordingly, if a pressure differential across both ends of the sensor tube (9) is made equal to that in a case where there exists no lines (10) for increasing differential pressure, a pressure differential across both ends of the bypass element (8) can be made higher than a pressure differential across both ends of the sensor tube (9). Consequently, the maximum flow rate in the bypass element (8) can be increased by a factor of 2.5 to 4, as compared with that in a case where there exists no lines (10) for increasing differential pressure.

Therefore, if the mass flow controller (A) according to the present invention is connected to a gas supply system of a precise facility such as a semiconductor manufacturing apparatus to cause gas to flow, the gas flows into the primary chamber (6). Much of the gas flows into the secondary chamber (7) through the bypass holes, and only a part of the gas flows in the sensor tube (9) through the lines (10) for increasing differential pressure and then, flows into the secondary chamber (7) to be mixed with the gas through the bypass holes. The gas flowing in the sensor tube (9) drains heat of the upstream-side heater (27a) and flows downstream, to restrain the amount of heat of the downstream-side heater (27b). A control circuit controls the upstream-side heater (27a) such that the upstream-side heater (27a) reaches an equilibrium temperature by supplying the heat drained. Consequently, the balance of power supplied to both the heaters (27a) and (27b) is upset, so that the mass flow rate of the gas flowing in the sensor tube (9) is detected by detecting and calculating the difference thereof. Such detection of the flow rate is a general method. The flow rate of the gas through the bypass holes is proportional to the flow rate of the gas in the sensor tube (9). Accordingly, the total flow rate of gas can be simply found by multiplying the flow rate in the sensor tube (9) by a predetermined coefficient. An output of a measured value in the sensor portion (C) is fed back to the control valve portion (B), where the control valve (30) is driven by the driving portion (31) to accurately control the mass flow rate of gas flowing in the valve chamber (18).

Figure 10:
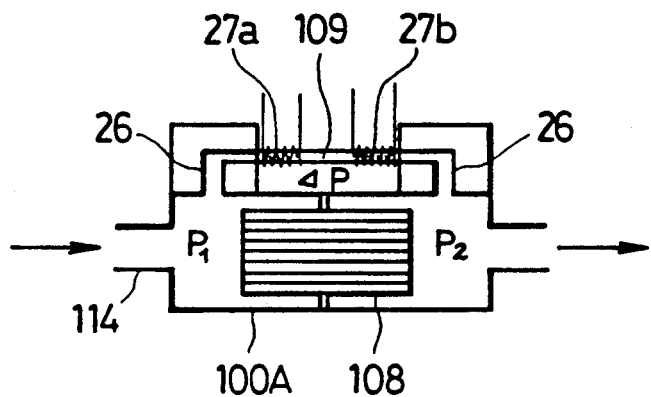
FIG. 10 is a schematic cross sectional front view showing a conventional mass flow controller.

Description is now made of the function of the lines (10) for increasing differential pressure in the spacer (12). The schematic view of FIG. 10 shows a conventional mass flow controller (100A). Let $P_1$ and $P_2$ be gas pressures in both ends of a bypass hole. In this case, a pressure differential $\Delta P$ is as follows:

$$\Delta p = P_1 - P_2 \quad (1)$$

Figure 11:
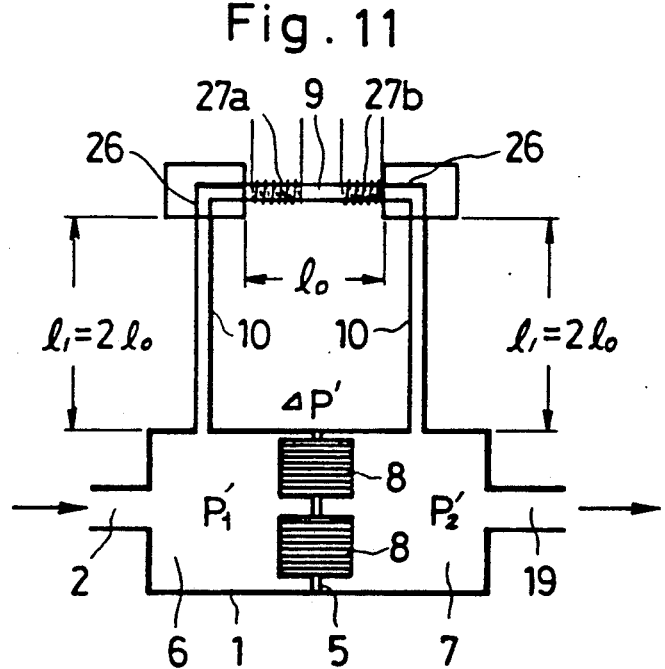
FIG. 11 is a schematic cross sectional front view showing the mass flow controller according to the present invention.

On the other hand, the schematic view of FIG. 11 shows a mass flow controller (A) according to the present invention (although in FIG. 11, two bypass elements (8) are arranged opposed to each other with respect to the gas flow (4) for convenience of the preparation of the drawing, the bypass elements (8) are arranged at right angles to the gas flow (4)). A pressure differential across both ends of the bypass element (8) is higher than a pressure differential across both ends of a sensor tube (9) by the resistance of the lines (10) for increasing differential pressure.

Let $\Delta P$ be a pressure differential across both ends of the sensor tube (9) and let $P_1$ and $P_2$ be gas pressures in both ends of the sensor tube (9), as in the above described conventional example. In this case, the same equation as the equation (1) is obtained.

The gas pressures $P_1$ and $P_2$ in both ends of the sensor tube (9) and the pressure differential $\Delta P$ across both ends of the sensor tube (9) respectively differ from gas pressures in both ends of the bypass element (8) and a pressure differential across both ends of the bypass element (8) due to the effect of the lines (10) for increasing differential pressure. Let $\Delta P'$ be the pressure differential across both ends of the bypass element (8), and let $P'_1$ and $P'_2$ be the gas pressures in both ends thereof. In this case, the following equation is obtained:

$$\Delta P' = P'_1 - P'_2 \quad (2)$$

It is assumed that $\Delta P'$ becomes n times $\Delta P$ due to the resistance of the lines (10) for increasing differential pressure, the following relation holds:

$$\Delta P' = n \cdot \Delta P \quad (3)$$

Herein a flow rate Q is proportional to a pressure differential across both ends. Accordingly, the following relations hold:

$$Q_1 \text{ (flow rate in a sensor tube)} = K \cdot \Delta P \qquad (4)$$

$$Q_2 \text{ (flow rate in a bypass element)} = K \cdot \Delta P' \qquad (5)$$

$$Q_2/Q_1 = \Delta P'/\Delta P = (n) \qquad (6)$$

Consequently, the flow rate in the bypass element (8) can be increased by a factor of n.

On the other hand, the maximum flow rate in the sensor tube (9) is proportional to $\Delta P = P_1 - P_2$, which is the same as the flow rate in the conventional sensor tube (9).

Therefore, even if the pressure differential across both ends of the bypass element (8) is increased by the lines (10) for increasing differential pressure, characteristics of differential pressure versus flow rate in the sensor tube (9) are not changed.

For example, if a line (10) for increasing differential pressure having the same inner diameter as that of the sensor tube (9) and having a length twice that thereof is used, a pressure differential across both ends of the bypass element (8) is as follows:

$$(l_0 + 2 \times l_1) \simeq (l_0) = (l_0 + 2 \times 2l_0) \simeq (l_0) = 5 \qquad (5)$$

In such a case, therefore, a flow rate which is five times that in the ordinary case can be controlled without changing the size of the mass flow controller (in other words, changing the type of mass flow controller).

The height of the spacer (12) and the thickness of the line (10) for increasing differential pressure can be also suitably changed depending on the flow rate. The area of an opening is increased and the speed of flow is reduced such that a part of the bypass element (8) is not turbulent flow due to the increase in pressure differential across both ends of the bypass element (8). An etching plate is suitable for the bypass element (8). In the present invention, the mass flow controller (A) has a bypass structure having etching plates arranged in parallel.

Furthermore, an etching plate is used as the bypass element (8) because it has a variety of advantages. For example, since the concave grooves (33) having almost the same cross sectional area can be mass-produced at one time, (1) the cost of the mass flow controller (A) can be lowered, (2) the possibility is eliminated that fins are formed on end surfaces of capillary tubes when the capillary tubes were mechanically cut, and (3) the effective cross sectional area of the etching plate can be made large because the wall thickness thereof can be made small, so that the mass flow controller (A) can be made compact.

Figure 12:
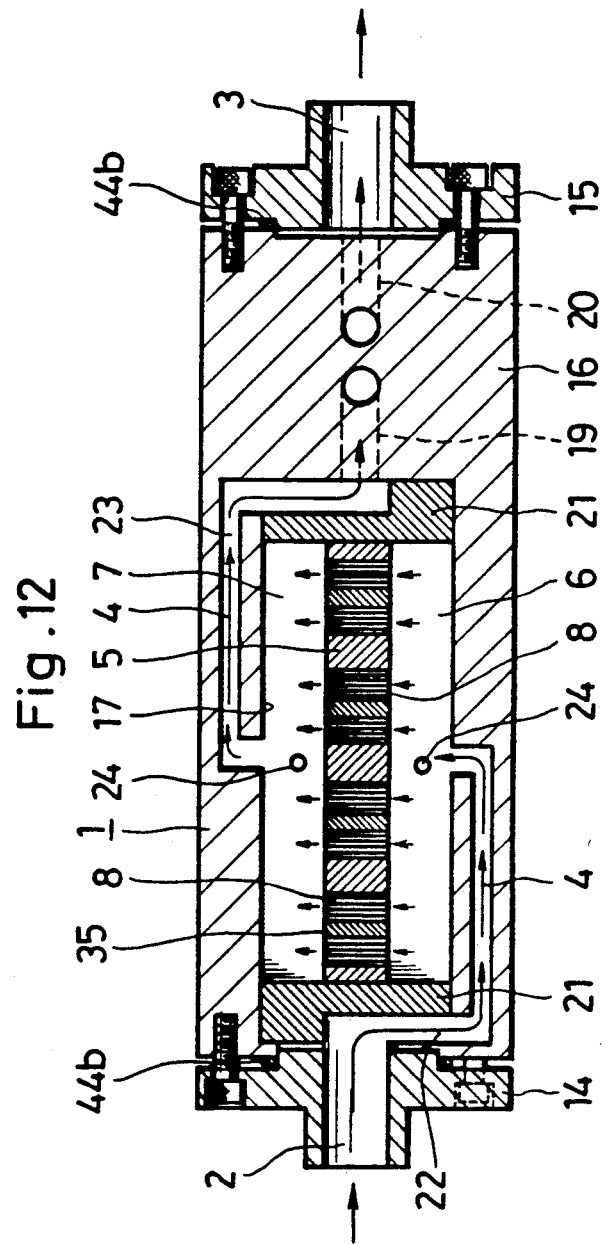
FIG. 12 is a cross sectional plan view showing a mass flow controller according to another embodiment of the present invention.

FIG. 12 shows another embodiment of the present invention. More specifically, a primary-side communicating hole (22) for connecting an inlet (2) to a primary chamber (6) and a secondary-side communicating hole (23) for connecting a secondary chamber (7) to a primary-side valve path (19) are formed in a main body (16), to be respectively open to central parts of the primary chamber (6) and the secondary chamber (7). In this case, however, the direction of gas flow (4) through the primary-side and secondary-side communicating holes (22) and (23) is parallel to a bulkhead (5).

Description is now made of the function of a control valve portion (B) with reference to FIGS. 13 to 16. In the control valve portion (B), a valve chamber (18) whose ceiling surface is a diaphragm (45) is provided in a housing block (28) fixed on a body (1), and a control valve (30) whose lower surface is an opening is provided in the valve chamber (18) such that it can be raised and lowered. The valve chamber (18) is so constructed that its lower half expands in a stepped shape and its upper half is a guide hole (53) for guiding the rise and fall of the control valve (30), as shown in FIGS. 13 to 16. A concave portion (48) of an opening is provided on a lower surface of the control valve (30), as described above. This concave portion (48) of the opening is so constructed that its upper half is narrow and its lower half expands in a stepped shape. A spring (32) is fitted in the narrow diameter portion, to press and urge the control valve (30) on the side of the diaphragm (45) which is the ceiling surface. Moreover, a projection (60) on the valve side which abuts on the diaphragm (45) is provided on an upper surface of the control valve (30), and a ring-shaped projection (30a) is provided on a lower surface of the control valve (30). Furthermore, an O-ring (46) is interposed between an inner side surface of the guide hole (53) in the valve chamber (18) and an outer side surface of the control valve (30) to divide the valve chamber (18) into a space (42) on the ceiling side and a space (49) on the valve seat side. In addition, the control valve (30) is provided with a communicating hole (47) for connecting the concave portion (48) of the opening on the lower surface of the control valve (30) to the space (42) on the ceiling side in the valve chamber (18).

A solenoid actuator casing serving as a driving portion (31) is provided upright and fixed on an upper surface of the housing block (28). A projection (61) on the control side which abuts on a projection (60) on the valve side is provided on a lower surface of the driving portion (31) through the diaphragm (45). The primary-side valve path (19) connected to the above secondary-side communicating hole (23) which is an outlet of a bypass is open to the concave portion (48) of the opening on the lower surface of the control valve (30) at the center of this valve chamber (18), and a secondary-side valve path (20) communicating with the exterior is open to the space (49) on the valve seat side in the valve chamber (18). Consequently, if fluid enters an inlet of the bypass, a part thereof passes through the sensor tube (9) to measure the flow rate, as described above. On the other hand, much of fluid flowing in the bypass element (8) flows at a flow rate accurately proportional to the flow rate in the sensor tube (9). The fluid flowing out of the bypass element (8) is mixed with the fluid passed through the sensor tube (9), to enter the primary-side valve path (19). On this occasion, the driving portion (31) is operated in proportion to a signal voltage from the sensor tube (9), to strictly adjust a clearance between the ring-shaped projection (30a) at a lower edge of the control valve (30) and a gold ring (44a) which is the valve seat (44) formed on an upper surface of the body (1) in cooperation with the elastic force of the spring (32) to strictly control the mass flow rate of the fluid flowing from the primary-side valve path (19) to the secondary-side valve path (20). During this time period, a part of the fluid which flows through the primary-side valve path (19) into the concave portion (48) of the opening on the lower surface of the control valve (30) enters the space (42) on the ceiling side through the communicating hole (47), to make the pressure in the space (42) on the ceiling side equal to the pressure in the concave portion (48) to reduce the inflow pressure of the fluid which flows through the primary-side valve path (19) into the concave portion (48). Consequently, the pressure applied to the driving portion (31) is reduced, to cause the control valve (30) to control the flow rate. The amount of the fluid flowing from the primary-side valve path (19) into the space (49) on the valve seat side in the valve chamber (18) is accurately regulated. Thereafter, the fluid flows out of the body (1) through the secondary-side valve path (20), to be supplied to the manufacturing apparatus.

Although in the above described embodiment, description was made of a case where the primary-side valve path (19) is open to the concave portion (48) of the opening on the lower surface of the control valve (30), the primary-side valve path (19) into which fluid flows from the sensor portion (C) may be provided in the space (49) on the valve seat side in the valve chamber (18) and the secondary-side valve path (20) communicating with the exterior may be provided in the concave portion (48) of the opening on the lower surface of the control valve (30).

Figure 13:
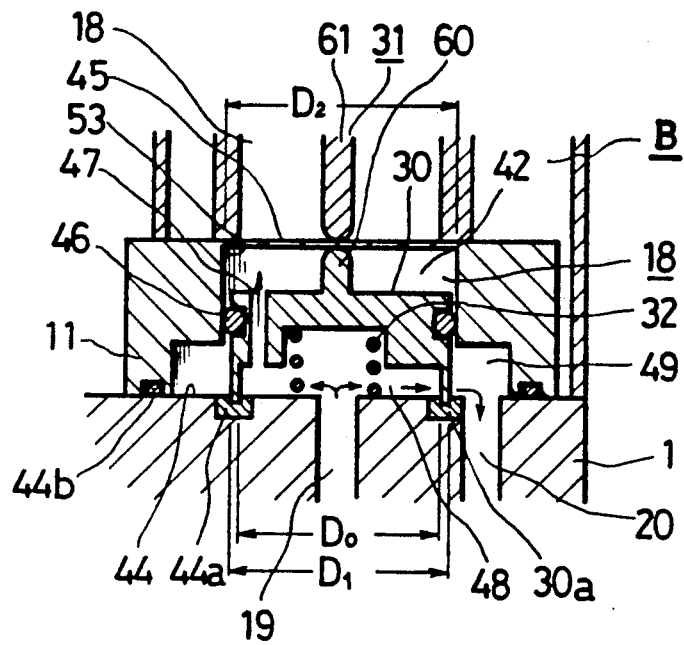
FIG. 13 is an enlarged cross sectional view showing a first example of a control valve portion according to the present invention.
Figure 14:
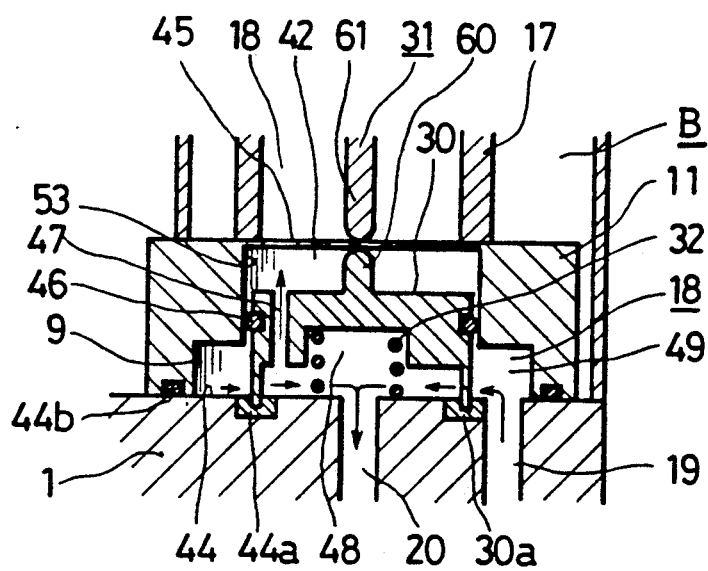
FIG. 14 is an enlarged cross sectional view showing a second example of the control valve portion according to the present invention.
Figure 15:
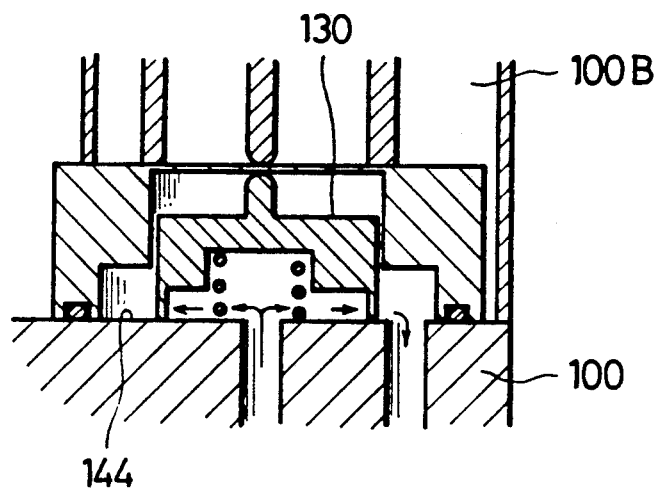
FIG. 15 is an enlarged cross sectional view showing a conventional example, which corresponds to FIG. 13.
Figure 16:
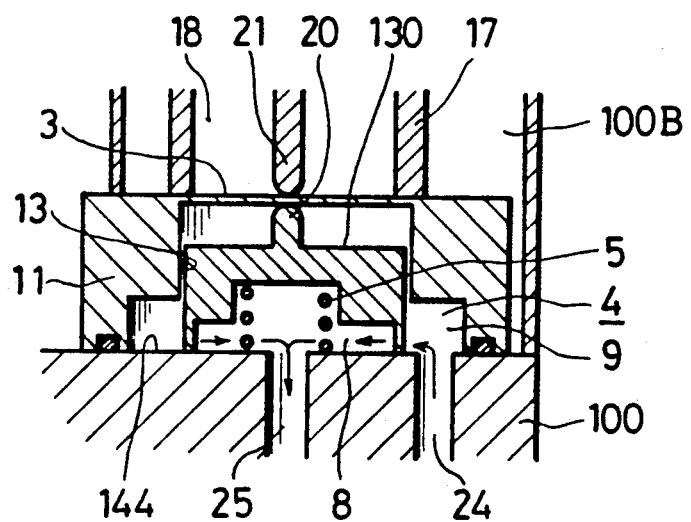
FIG. 16 is an enlarged cross sectional view showing a conventional example, which corresponds to FIG. 14.

The effect of the valve structure according to the present invention will be numerically described. FIGS. 15 and 16 show the valve structure in the conventional example, and FIGS. 13 and 14 show the valve structure according to the present invention (The valve structure shown in FIGS. 13 and 14 and the valve structure shown in FIGS. 2 and 19 slightly differ from each other but the operating principles thereof are the same). Both the valve structures differ in the presence or absence of the O-ring (46) interposed between the inner side surface of the valve chamber (18) and the outer side surface of the control valve (30) and the presence or absence of the communicating hole (47) for connecting the concave portion (48) of the opening on the lower surface of the control valve (30) to the space (42) on the ceiling side in the valve chamber (18).

Conventional Example 1

FIG. 15 shows a case of a conventional example 1.
$P_0$: inlet pressure of fluid (kgf/cm$^2$).
$P_1$: force to push down a control valve (130) by a driving portion (kgf).
$P_2$: force to push up the control valve by the fluid pressure $P_0$ (kgf)

$$= (\pi/4) \cdot D_0^2 \cdot P_0$$

($D_0$: inner diameter at a lower edge of the control valve)
$P_3$: force to push up the control valve by a spring (kgf).

This force is made equal to the force to push down the control valve through a diaphragm by atmospheric pressure on the side of the driving portion when vacuum is developed on the side of an outlet of fluid (a secondary-side valve path) (so as to perform the function of valves, that is, hold the amount of lifting when vacuum is developed on the side of the outlet of fluid). Two-thirds of the load applied to the entire diaphragm is applied to an outer peripheral portion of the diaphragm and the remaining one-third thereof is applied to a projection on the control side. This force to push up the control valve by the spring is equal to one-third of the load.

Accordingly, $$P_3 = (\pi \cdot D_2^2/4) \cdot 1 \cdot (\tfrac{1}{3})$$
$$= (\pi \cdot D_2^2/12)(\text{kgf})$$

$P_4$: force required to seal fluid between the lower edge of the control valve and a surface where the control valve abuts on a valve seat (144) (kgf).
$p_5$: reaction force developed in making a diaphragm flex when the control valve is pressed against the above surface where the control valve abuts on the valve seat because the diaphragm is one type of spring (kgf).

The following relation holds between the above described forces:

$$P_1 = P_2 + P_3 + P_4 + P_5 \qquad (1)$$
$$= \{(\pi/4) \cdot D_0^2 \cdot P_0\} + \{(\pi \cdot D_2^2/12)\} + P_4 + P_5$$
$$= [(\pi/12)(3D_0^2 \cdot P_0 + D_2^2)] + P_4 + P_5$$

Conventional Example 2

FIG. 16 shows a case of a conventional example 2 (in this case, the direction in which fluid flows is opposite to that in the case of FIG. 15).
$P_0$: inlet pressure of fluid (kgf/cm$^2$).
$P_1$: force to push down a control valve by a driving portion (kgf).
$P_2$: force to push up the control valve by the fluid pressure $P_0$ (kgf)

$$= (\pi/4) \cdot D_1^2 \cdot P_0$$

($D_1$: outer diameter at a lower edge of the control valve)
$P_3$: force to push up the control valve by a spring (kgf).

This force is made equal to the force $P_2$ to push down the control valve when vacuum is developed on the side of an outlet of fluid (a secondary-side valve path) and the fluid pressure on the side of an inlet of fluid (a primary-side valve path) has a maximum.

Accordingly, $$P_3 = (\pi \cdot D_1^2/4) \cdot P_{0max}$$

$P_4$: force required to seal fluid between the lower edge of the control valve and a surface where the control valve abuts on a valve seat (kgf), which is equal to that in the case of the above described conventional example 1 shown in FIG. 15.
$P_5$: reaction force of a diaphragm, which is equal to that in the case of the above described conventional example 1 shown in FIG. 15.
$P_6$: force to push up a driving portion through the diaphragm by the fluid pressure $P_0$ (kgf).

Two-thirds of the load applied to the entire diaphragm is applied to an outer peripheral portion of the diaphragm and one-third thereof is applied to a projection on the control side. One-third of the load is equal to $P_6$.

Accordingly, $$P_6 = (\pi \cdot D_2^2/4) \cdot P_0 \cdot (\tfrac{1}{3})$$
$$= (\pi \cdot D_2^2/12) \cdot P_0 \text{ (kgf)}$$

The following relation holds between the above described forces:

$$\begin{aligned}
P_1 &= -P_2 + P_3 + P_4 + P_5 (\pi \cdot D_2^2/12) \cdot P_0 \quad (2)\\
&= -(\pi/4) \cdot D_1^2 \cdot P_0 + (\pi \cdot D_1^2/4) \cdot P_{0max} + \\
&\quad (\pi \cdot D_2^2/12) \cdot P_0 + P_4 + P_5 \\
&= (\pi/12)(D_2^2 \cdot P_0 + 3D_1^2 \cdot P_{0max} - 3D_1^2 \cdot P_0) + \\
&\quad P_4 + P_5
\end{aligned}$$

First Embodiment of the Present Invention

FIG. 13 shows a case of a first embodiment of the present invention.

$P_0$: inlet pressure of fluid (kgf/cm²).

$P_1$: force to push down a control valve (30) by a driving portion (31) (kgf).

$P_2$: force to push down the control valve (30) by the fluid pressure $P_0$ $$= (\pi/4)(D_1^2 - D_0^2) \cdot P_0$$

$P_3$: force to push up the control valve (30) by a spring (32) (kgf).

If friction produced by an O-ring (57) between the control valve (30) and a housing block (28) is ignored, this force is made equal in absolute value to the force $P_{2max}$ to push down the control valve (30) by the maximum fluid pressure $P_0$.

Accordingly, $P_3 = P_{2max}$ $P_4$: force required to seal fluid between a lower edge of the control valve (30) and a surface (27) where the control valve (30) abuts on a valve seat (44a) (kgf), which is the same as that in the case of the conventional example 1 shown in FIG. 15.

$P_5$: reaction force of a diaphragm (45) (kgf), which is the same as that in the case of the conventional example 1 shown in FIG. 15.

$P_6$: force to push up the driving portion (31) through the diaphragm (45) by the fluid pressure $P_0$ (kgf), which is the same as that in the case of the conventional example 2 shown in FIG. 16.

Accordingly, $$P_6 = (\pi \cdot D_2^2/12) \cdot P_0 \text{ (kgf)}$$

The follwing relation holds between the above described forces:

$$\begin{aligned}
P_1 &= -P_2 + P_3 + P_4 + P_5 + P_6 \quad (8)\\
&= -(\pi/4)(D_1^2 - D_0^2) P_0 + \\
&\quad (\pi/4)(D_1^2 - D_0^2) P_{0max} + P_4 + P_5 + \\
&\quad (\pi \cdot D_2^2/12) \cdot P_0 \\
&= (\pi/12)(D_2^2 + 3D_0^2 - 3D_1^2) P_0 + P_4 + P_5
\end{aligned}$$

Second Embodiment of the Present Invention

FIG. 14 shows a case of a second embodiment of the present invention (in the case, the direction in which fluid flows is opposite to that in the case of FIG. 13).

$P_0$: inlet pressure of fluid (kgf/cm²).

$P_1$: force to push down a control valve (30) by a driving portion (31) (kgf).

$P_3$: force to push up the control valve (30) by a spring (32) (kgf)

If friction produced by an O-ring (46) between the control valve (30) and a housing block (28) is ignored, this force $P_3$ is made equal to the force to push down the control valve (30) through a diaphragm (45) by atmospheric pressure on the side of the driving portion (31) when vacuum is developed on the side of an inlet of fluid (a secondary-side valve path (20)). That is, this force is equal to $P_3$ in the first embodiment shown in FIG. 13.

Accordingly, $$P_3 = (\pi \cdot D_2^2/12)$$

$P_4$: force required to seal fluid between a lower edge of the control valve (30) and a gold ring (44a) which is a valve seat (44) located in a body (1) (kgf), which is the same as that in the case of the first embodiment shown in FIG. 13.

$P_5$: reaction force of the diaphragm (45), which is the same as that in the case of the first embodiment shown in FIG. 13.

The following relation holds between the above described forces:

$$\begin{aligned}
P_1 &= P_3 + P_4 + P_5 \quad (4)\\
&= (\pi/12) \cdot D_2^2 + P_4 + P_5 \\
&= 0.083\pi \cdot D_2^2 + P_4 + P_5
\end{aligned}$$

The forces $P_1$ to push down the control valve (30) by the driving portion (31) in the respective cases will be compared with each other.

As an example, it is assumed that the fluid pressure is 0.5 to 3 kgf/cm². In this case, $P_{0max} = 3$ kgf/cm².

The sizes $D_0$, $D_1$ and $D_2$ satisfy the relation $D_0 < D_1 < D_2$. However, for simplify the calculation, an approximation is made with $D_1 = D_2$. In addition, let $D_0 = 0.9D_1 = 0.9D_2$ so as not to increase the sealing force $P_4$.

(I) At the time of $P_0 = 3$ kgf/cm², the following equation is obtained from the equation (1):

$$\begin{aligned}
P_1 &= (\pi/12)(3D_0^2 \cdot P_0 + D_2^2) + P_4 + P_5 \quad (1)'\\
&= (\pi/12)\{3(0.9D_2)^2 \times 3 + D_2^2\} + P_4 + P_5 \\
&= 0.691\pi D_2^2 + P_4 + P_5
\end{aligned}$$

From the equation (2), the following equation is obtained:

$$\begin{aligned}
P_1 &= (\pi/12)(D_2^2 + D_2^2 - 3D_2^2) \times 3 + P_4 + P_5 \quad (2)'\\
&= 0.25\pi D_2^2 + P_4 + P_5
\end{aligned}$$

From the equation (3), the following equation is obtained:

$$P_1 = (\pi/12)(D_2^2 + 3(0.9D_2)^2 - 3D_2^2) \times 3 + P_4 + P_5 \quad (3)'$$
$$= 0.108\pi D_2^2 + P_4 + P_5$$

The equation (4) remains unchanged:

$$P_1 = 0.083\pi \cdot D_2^2 + P_4 + P_5 \quad (4)$$

(II) At the time of $P_0 = 0.5$ kgf/cm², the following equation is obtained from the equation (1):

$$P_1 = (\pi/12)\{3(0.9D_2)^2 \times 0.5 + D_2^2\} + P_4 + P_5 \quad (1)''$$
$$= 0.185\pi + P_4 + P_5$$

From the equation (2), the following equation is obtained:

$$P_1 = (\pi/12)(D_2^2 \times 0.5 + 3 \times D_2^2 \times 3 - 3D_2^2 \times 0.5) + P_4 + P_5 \quad (2)''$$
$$= 0.667\pi D_2^2 + P_4 + P_5$$

From the equation (3), the following equation is obtained:

$$P_1 = (\pi/12)(D_2^2 + 3(0.9D_2)^2 - 3D_1^2) \times 0.5 + P_4 + P_5 \quad (3)''$$
$$= 0.018\pi D_2^2 + P_4 + P_5$$

The equation (4) remains unchanged:

$$P_1 = 0.083\pi \cdot D_2^2 + P_4 + P_5 \quad (4)$$

As a result of (I) and (II), the load on the driving portion has a maximum at a fluid pressure of 0.5 to 3 kgf/cm² when $P_1 = 0.691\pi D_2^2 + P_5$ from the equation (1)' in the case of the conventional example 1 (see FIG. 15), $P_1 = 0.667\pi D_2^2 + P_4 + P_5$ from the equation (2)'' in the case of the conventional example 2 (see FIG. 16), $P_1 = 0.108\pi D_2^2 + P_4 + P_5$ from the equation (3)' in the case of the first embodiment of the present invention (see FIG. 13), and $P_1 = 0.083\pi D_2^2 + P_4 + P_5$ from the equation (4) in the case of the second embodiment of the present invention (see FIG. 14).

From the above described results, the force $P_1$ to push down the control valve (30) by the driving portion (31) which is represented by the equations (3)' and (4) in the case of the valve structure according to the present invention may be smaller than the force $P_1$ which is represented by the equations (1)' and (2)'' in the case of the valve structure in the conventional example. When the driving portions (31) having the same output are used in the respective cases and such a diameter of the control valve (30) that fluid can be sealed is determined in the cases of equations (3)' and (4), the sealing force $P_4$ becomes smaller in the cases of the equations (1)' and (2)'' to develop leakage. Accordingly, the diameter of the control valve (30) must be made smaller so as to seal fluid, which means that the flow rate is reduced. Conversely, the load applied on the driving portion (31) is decreased in the valve structure according to the present invention, which means that fluid can be caused to flow at a larger flow rate if the size of the valve structure is the same as that of the valve structure in the conventional example.

Figure 17:
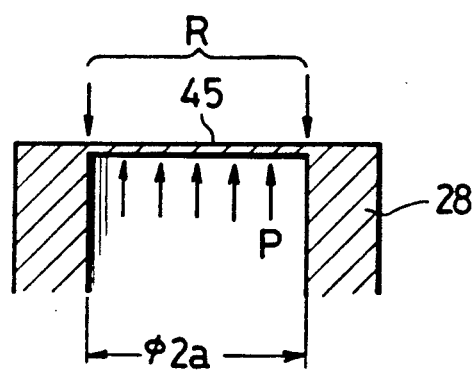
FIGS. 17 and 18 are cross sectional views showing a diaphragm portion for explaining the force to push up a control valve by a spring.

If a pressure P is applied to the diaphragm (45) having a diameter of 2a as shown in FIG. 17, a reaction force R which is equal to a load $\pi a^2 p$ caused by the pressure P in the outer peripheral portion of the diaphragm (45) is produced to balance the force P.

Figure 18:
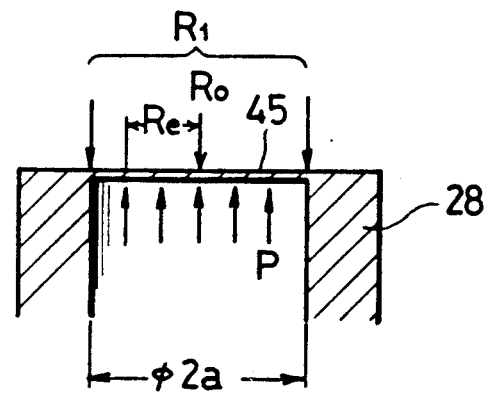

If as shown in FIG. 18, a projection (61) on the control side is provided at the center of FIG. 17, the resultant force $R_0 + R_1$ of a reaction force $R_0$ of the projection (61) on the control side and a reaction force $R_1$ in the outer peripheral portion balances the load $\pi a^2 p$ caused by the pressure P.

The center of the diaphragm (45) is taken as the origin. It is assumed that the center line of the diaphragm (45) exists in a place spaced Re apart from the origin in the direction of the outer diameter. In this case, the following relation holds:

$$\int_0^{Re} (Re - r)2\pi r \, dr = \int_{Re}^a (r - Re)2\pi r \, dr \quad (1)$$

$$R_0 Re = R_1 (a - Re) \quad (2)$$
$$R_0 + R_1 = 2\pi a^2 P \quad (3)$$

From the equation (1),
$$Re = (\tfrac{2}{3})a \quad (1')$$

From the equations (1'), (2) and (3),
$$R_0 = (\tfrac{1}{3})\pi a^2 P,$$

and $$R_1 = (\tfrac{2}{3})\pi a^2 P$$

Consequently, the force $P_3$ to push up the control valve (30) by the spring (32) is equal to one-third of the load applied to the entire diaphragm (45).

Description is now made of the function of the gold ring (44a) which is the valve seat (44) with reference to FIG. 19. The gold ring (44a) is a chemically very stable substance. Accordingly, even if the gold ring (44a) comes into contact with the above described various types of fluids, the gold ring (44a) does not react with almost all of them and is not degraded. Moreover, the gold ring (44a) is substantially softer than the control valve (30) made of stainless steel. Accordingly, the generation of particles by the opening or closing of the control valve (30) is significantly restrained. Consequently, the degree of cleanliness of the fluid passing through the control valve portion (B) is not lowered more often than the conventional example. In addition, a ring-shaped groove (50) is provided on an upper surface of the gold ring (44a) as described above so that a ring-shaped projection (30a) of the control valve (30) cuts into the ring-shaped groove (50) at the time of blocking the control valve (30), to enhance the sealing effect. In particular, if the ring-shaped concave groove (50) and the ring-shaped projection (30a) are so constructed as to have a trapezoidal shape having at least one inclined sidewall in cross section, the inclined sidewalls are airtightly bonded to each other at the time of blocking the control valve (30), to achieve a high sealing effect.

Figure 21:
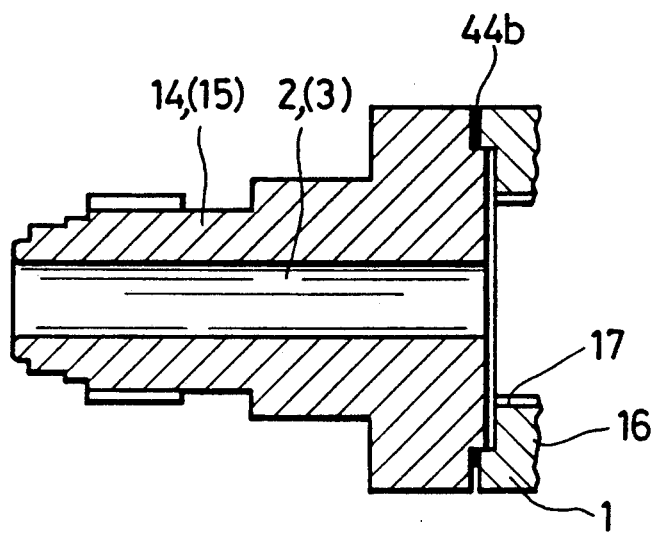
FIG. 21 is an enlarged detailed cross sectional view showing a state where a joint portion is sealed by a gold ring according to the present invention.
Figure 22:
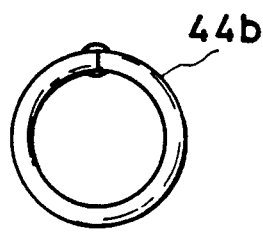
FIG. 22 is a plan view showing the gold ring used in the present invention.
Figure 23:
FIG. 23 is a cross sectional view showing a first example of the gold ring shown in FIG. 22.
Figure 24:
FIG. 24 is a cross sectional view showing a second example of the gold ring shown in FIG. 22.
Figure 25:
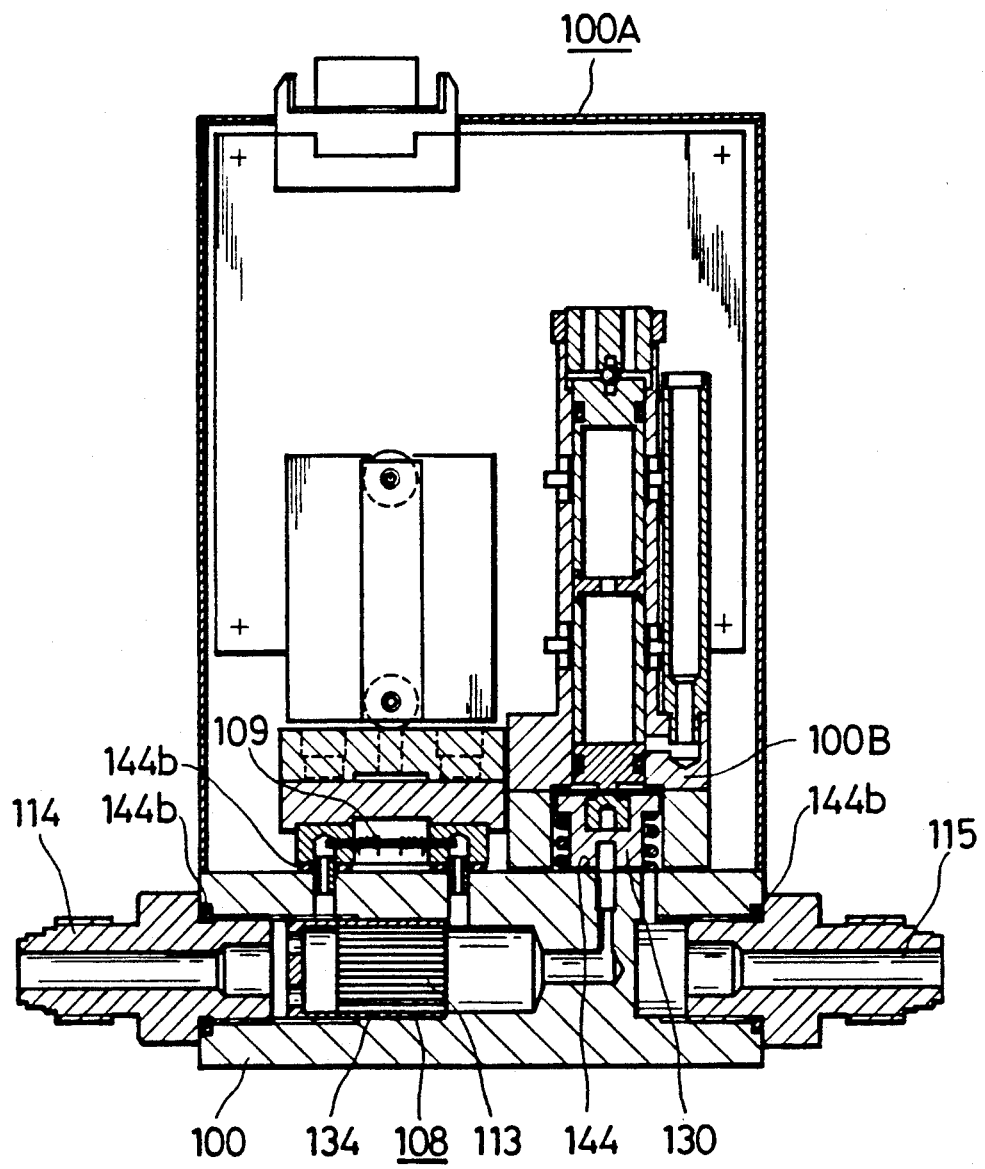
FIG. 25 is a cross sectional view showing the conventional mass flow controller.

Furthermore, as shown in FIGS. 20 and 21, if a gold ring (44b) is provided in a connecting boundary between members constituting the path of flow of fluid, for example, a sensor portion (C) and joints (14) and (15)

so as to surround the path of flow and the joints (14) and (15) are clamped, the gold ring (44b) is crushed by the members and airtightly held in the connecting boundary, to exhibit the sealing effect. Since this gold ring (44b) has the chemically very stable nature as described above, it does not react with almost all fluids, to exhibit a stable sealing effect for a long time period.

Although gold wire made in a ring shape is used as the gold rings (44a) and (44b), the present invention is not limited to the same. For example, the present invention includes a case where a contact surface is plated with gold.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mass flow controller having a bypass portion through which a large amount of gas is passed and a sensor portion through which gas flows at a small flow rate proportional to the flow rate of the gas passed through said bypass portion and capable of measuring the total flow rate of gas by measuring the flow rate in the sensor portion, the mass flow controller having a main body (16), a bulkhead (5) in said main body, a primary chamber and a secondary chamber formed on opposite sides of said bulkhead, said primary chamber being provided with an inlet for gas inflow and said secondary chamber being provided with an outlet for gas outflow, said bulkhead being substantially parallel with a direction of the gas flow to be measured and provided with a plurality of through holes, said through holes are arranged in parallel with their centers nearly at right angles to the bulkhead surfaces and every through hole communicates with both the primary chamber and the secondary chamber, bypass elements depending on the flow rate are fitted in some of the through holes in the bulkhead for connecting the primary chamber to the secondary chamber, each of said bypass elements is provided with a plurality of bypass passages arranged in parallel, and expansion plugs are fitted in the through holes in which no bypass elements are fitted to prevent any gas to flow therethrough, and a sensor in said sensor portion is connected between said primary chamber and said secondary chamber for measuring the flow rate of gas.

2. A mass flow controller according to claim 1, which includes a first flow line that connects said primary chamber in said main body with an inlet to said sensor and a second flow line that connects an outlet of said sensor to said secondary chamber in said main body in order to produce a pressure differential.

3. A mass flow controller according to claim 1, wherein the bypass elements fitted in the bulkhead are each provided with bypass holes in the axial direction which are formed by providing a plurality of concave grooves in the width direction on the surface of a strip body and winding the strip body to fit in the bulkhead.

4. A mass flow controller according to claim 2, wherein the bypass elements fitted in the bulkhead are each provided with bypass holes in the axial direction which are formed by providing a plurality of concave grooves in the width direction on the surface of a strip body and winding the strip body to fit in the bulkhead.

* * * * *